United States Patent [19]
Anderson

[11] Patent Number: 5,812,736
[45] Date of Patent: Sep. 22, 1998

[54] METHOD AND SYSTEM FOR CREATING A SLIDE SHOW WITH A SOUND TRACK IN REAL-TIME USING A DIGITAL CAMERA

[75] Inventor: Eric C. Anderson, San Jose, Calif.

[73] Assignee: FlashPoint Technology, Inc., San Jose, Calif.

[21] Appl. No.: 723,019

[22] Filed: Sep. 30, 1996

[51] Int. Cl.$^6$ .............................. H04N 5/91; H04N 5/928
[52] U.S. Cl. .............................................. 386/96; 386/107
[58] Field of Search ................................ 386/95, 96, 107, 386/117, 121, 54, 39, 120, 46, 104; 360/32; H04N 5/91, 5/928

[56] References Cited

U.S. PATENT DOCUMENTS 5,521,663  5/1996  Norris, III ................................ 354/106

*Primary Examiner*—Robert Chevalier
*Attorney, Agent, or Firm*—Stephen G. Sullivan

[57] ABSTRACT

A method and system for creating a slide show with real-time audio in a digital camera. First audio is recorded that implicitly includes a time-based time-line. While the audio is being recorded, a plurality of images are captured, where each one of the plurality of images is captured at some time along the time-line. After capturing images, the recording of the audio is ended. The method and system further includes presenting a slide show from the plurality of images and the recorded audio by playing the recorded audio, while displaying each one of the plurality of images on a display device at the time that the image was captured along the time-line of the recorded audio.

14 Claims, 5 Drawing Sheets

METHOD AND SYSTEM FOR CREATING A SLIDE SHOW WITH A SOUND TRACK IN REAL-TIME USING A DIGITAL CAMERA

FIELD OF THE INVENTION

The present invention relates generally to digital cameras, and more particularly to a method and system for creating a slide show with a sound track in real-time.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. Efficient operation of the computer is therefore an important consideration for camera designers and manufacturers. The memory architecture of a particular computer system determines data storage techniques and can thus significantly effect the operational efficiency of the entire digital camera system.

The user interface in conventional digital cameras typically includes a view finder in which small versions of the captured images may be displayed to allow a user to review several images at once. By selecting one of the images, the user may then display the full-sized version of the images in the view finder.

Due to architectural limitations of conventional digital cameras, there are several drawbacks in creating multimedia objects from captured images. As used conventionally, the term multimedia implies that the object includes some combination of graphics, sound, and text. Some types of conventional digital cameras, however, do not have the capability of recording sound, not to mention the capability of attaching a sound clip to a captured image to create a multimedia object. Most of the digital cameras that do not have sound recording capability do allow the user to display a sequence of full-sized versions of captured images in the view finder. Since images are not a time-based media, simply capturing images without sound results in the images being displayed in the view finder at arbitrary prefixed intervals, such as a five second delay between images, for instance.

As stated above, some conventional digital cameras have sound recording capability. The recording of sound, however, is typically only provided to allow the user to annotate the last image captured. This is done by capturing the image, recording a sound clip to annotate the image, and then attaching the sound clip to the captured image.

Although the recording of sound to annotate a captured image is an improvement over cameras that have no sound recording capability, the method has several disadvantages. One disadvantage is that the user must first download the captured image and the attached sound to a personal computer in order to hear the annotation and to view the image, even if the digital camera includes a view finder.

Another disadvantage in annotating a single image is that only the last image captured by the camera may be annotated by sound. Thus, if the user captures an image and forgets to annotate it before capturing another image, the previously captured image can never be annotated. A corresponding disadvantage is that the sound associated with the image is recorded either before or after the image captured. Thus, the image cannot be matched exactly with the sound that the user heard when the image was captured.

When a single image is captured and sound is associated with that image in this manner, timing is typically not an issue. When the user subsequently views the image, the sound clip is played and the image is displayed on the computer screen until completion of the recording.

Accordingly, what is needed is a method and system for creating multimedia objects from captured images using a digital camera. The present invention addresses such a need.

SUMMARY OF THE INVENTION

The present invention provides method and system for creating a slide show with real-time audio in a digital camera. First audio is recorded, where the audio recording implicitly includes a time-based time-line. While the audio is being recorded, a plurality of images are captured, where each one of the plurality of images is captured at some time along the time-line. After capturing the images, the recording of the audio is ended. The method and system further includes presenting a slide show from the plurality of images and the recorded audio by playing the recorded audio, while displaying each one of the plurality of images on a display device at the time that the image was captured along the time-line of the recorded audio.

According to the system and method disclosed herein, multimedia objects may be created in real-time and stored in the camera. Upon playback, the multimedia object plays sound and displays a series of corresponding captured images at the same time along the recording that the images were captured. The resulting multimedia object avoids the poor quality images offered by video recorders.

DESCRIPTION OF THE INVENTION

The present invention relates to an improvement in digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a digital camera that includes a method and system for creating slide shows from captured images in real-time.

Figure 1:
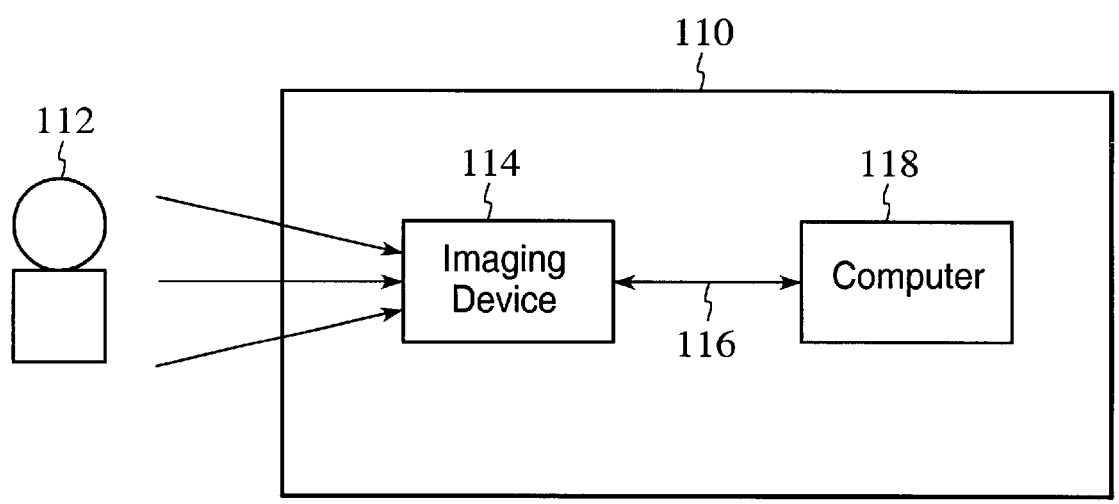
FIG. 1 is a block diagram of a digital camera that operates in accordance with the present invention.

Referring now to FIG. 1, a block diagram of a camera 110 is shown for use in accordance to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
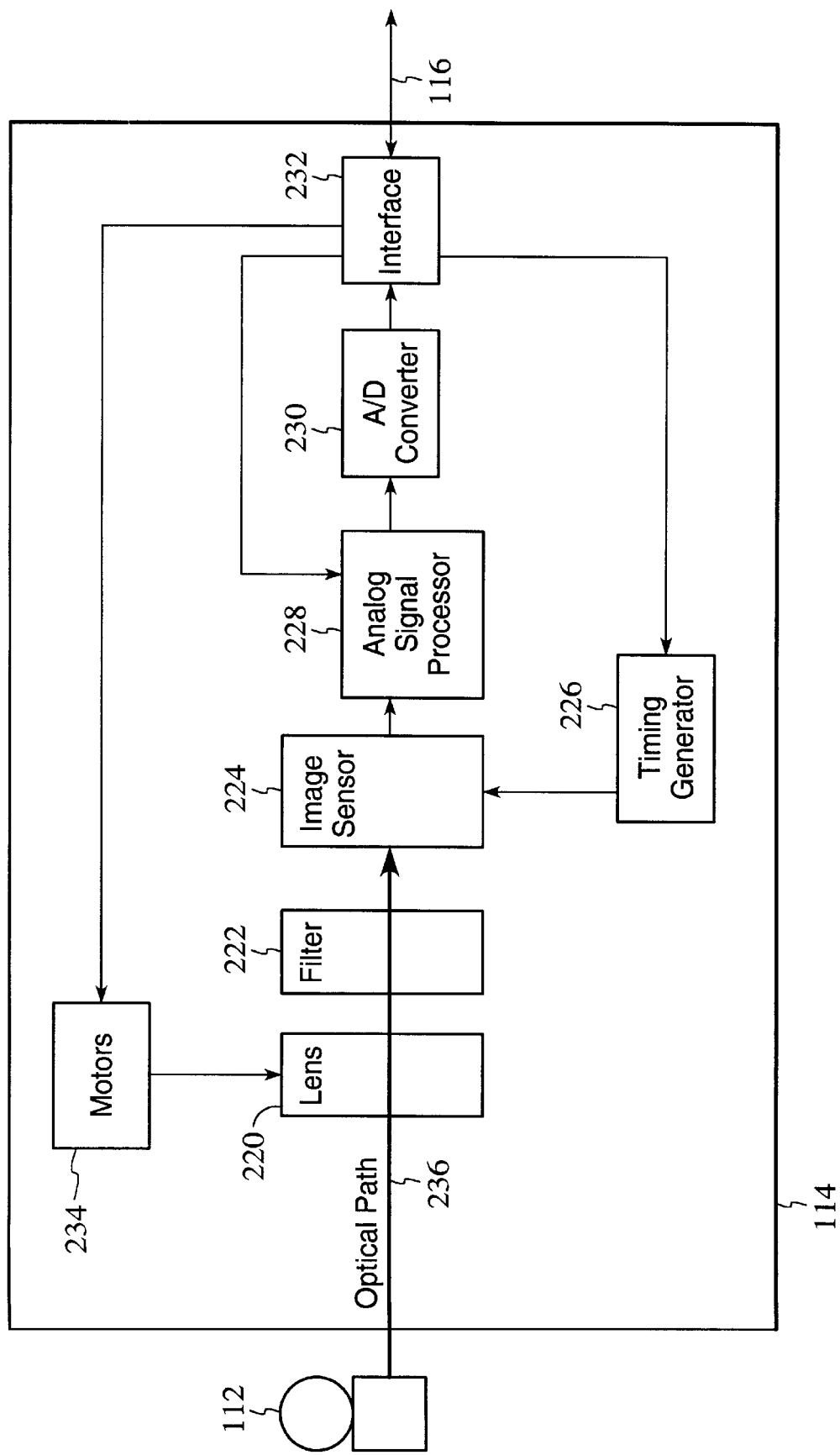
FIG. 2 is a block diagram of the preferred embodiment for the imaging device of FIG. 1.

Referring now to FIG. 2, a block diagram of the imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234. Briefly, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
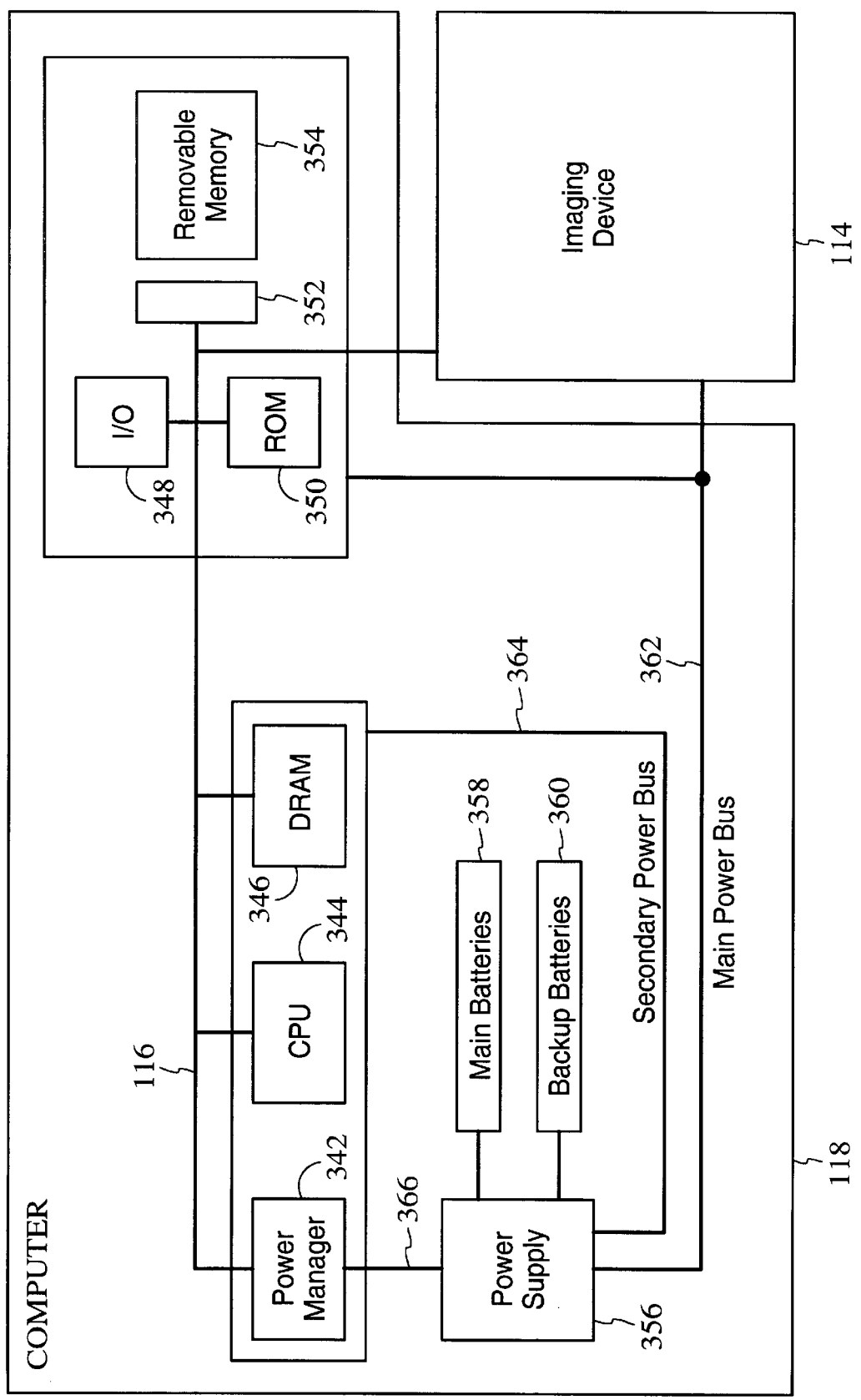
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions.

I/O 348 is an interface device allowing communications to and from computer 118. For example, I/O 348 permits an external host computer (not shown) to connect to and communicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Figure 4:
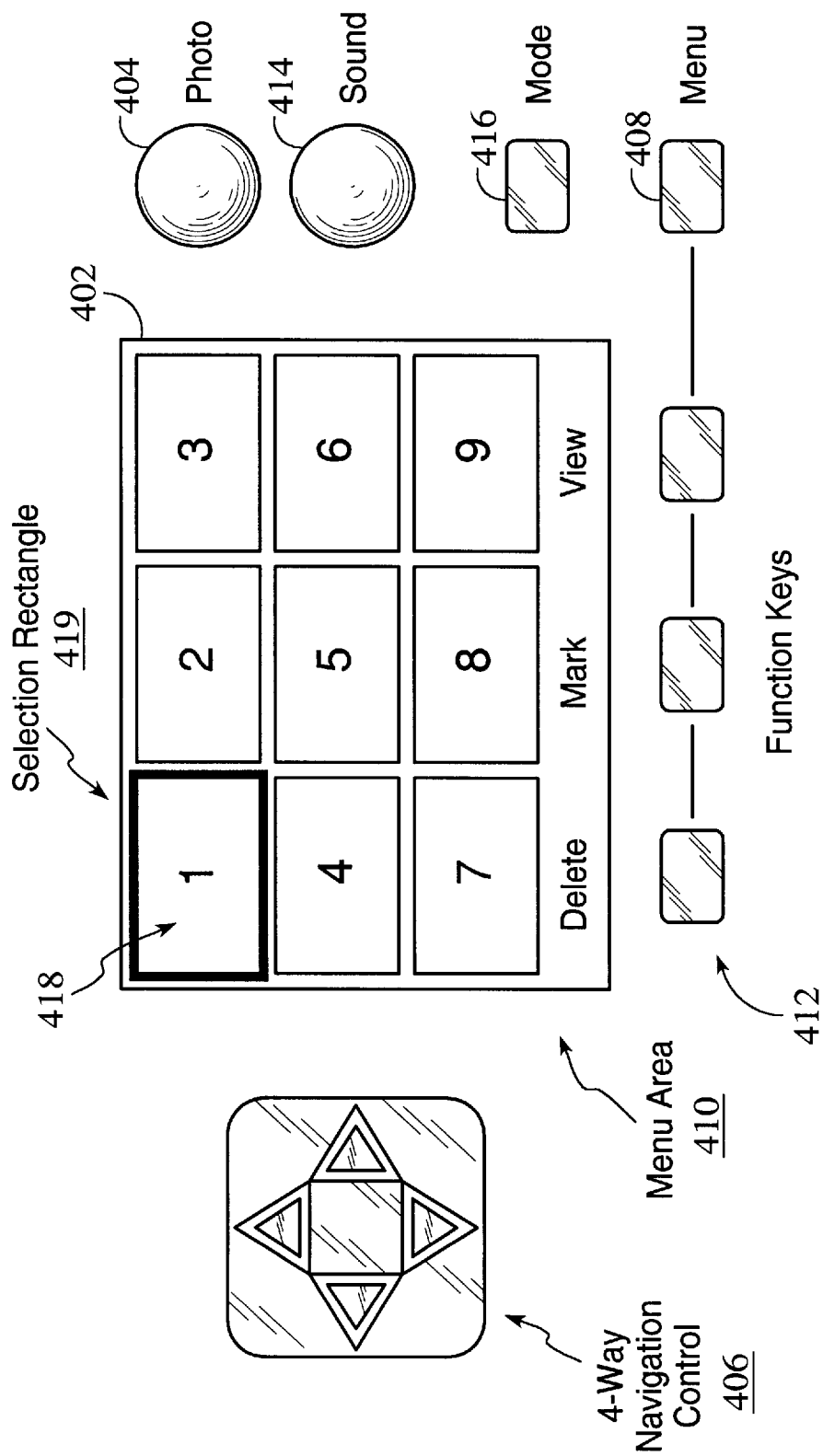
FIG. 4 is a block diagram depicting a user interface for the digital camera.

FIG. 4 is a block diagram depicting a user interface 400 for the digital camera as described in co-pending U.S. patent application Ser. No. 08/702,286, entitled "A Method and System For Grouping Images In A Digital Camera," and assigned to the Assignee of the present application. In one preferred embodiment, the user interface includes a view finder 402, an image capture button called a photo button 404, a four-way navigation control button 406, a menu button 408, a menu area 410 within the view finder 402, and function keys 412. The user interface may also include an optional sound button 414 and a mode button 416.

Referring again to FIGS. 1 and 4, the user interface 400 operates in two modes: view finder mode and review mode. In a preferred embodiment, the photo button 404 is a two position button. The view finder mode begins when a user aims the camera at an object 112 and presses the photo button 404 into the first position. Once this occurs, the view finder 402 displays the image of the object 112 as shown through the camera's imaging device 114. The user may then press the photo button 404 into the second position to capture the image shown in the view finder 402. Review mode begins by pressing any other button on the interface 400.

Referring again to FIG. 4, once in the review mode, the view finder 402 displays a series of cells 418 that represent the digital images that have been captured in the digital camera. The view finder 402 is shown here as displaying nine image cells 418. Each cell 418 displays a small-sized image corresponding to one of the captured images. The user may navigate through the series of displayed cells 418 in the view finder 402 using the four-way navigation control button 406. The cell 418 currently selected by the four-way navigation control 406 is encircled with a highlighted area 419, which is shown as a selection rectangle. Other shapes for the highlighted area are also suitable. Once a cell 418 has been selected, the user may depress one of the function buttons 412 to in order to display a full-sized version of the image in the view finder 402.

As stated above, some types of conventional digital cameras provide a method for annotating captured images. The user records sound either before or after the last image was captured (one or the other, but not both), and then associates the sound with the image. Since images are not a time-based media, timing is not an issue when playing both the sound and the image. The image is simply displayed until completion of the recording.

In some cameras, this method is impractical since the user must first download the captured image and corresponding sound to a personal computer in order to and hear the annotation and to view the image. Moreover, when annotating the image, the sound associated with the image is recorded either before or after the image is captured; the user has no ability to record the sound as the image is captured.

According to the present invention, a series of images may be captured in real-time while audio is being recorded. Since individual still images are not inherently a time-based media, each image is associated with a specific time reference in the audio track as the images are captured. The images and corresponding time references, and the audio track are then stored as a multimedia object called a slide show. When the slide show is subsequently presented, the audio recording is played, and each of the corresponding images is displayed at the time the images were originally captured during the recording.

Figure 5:
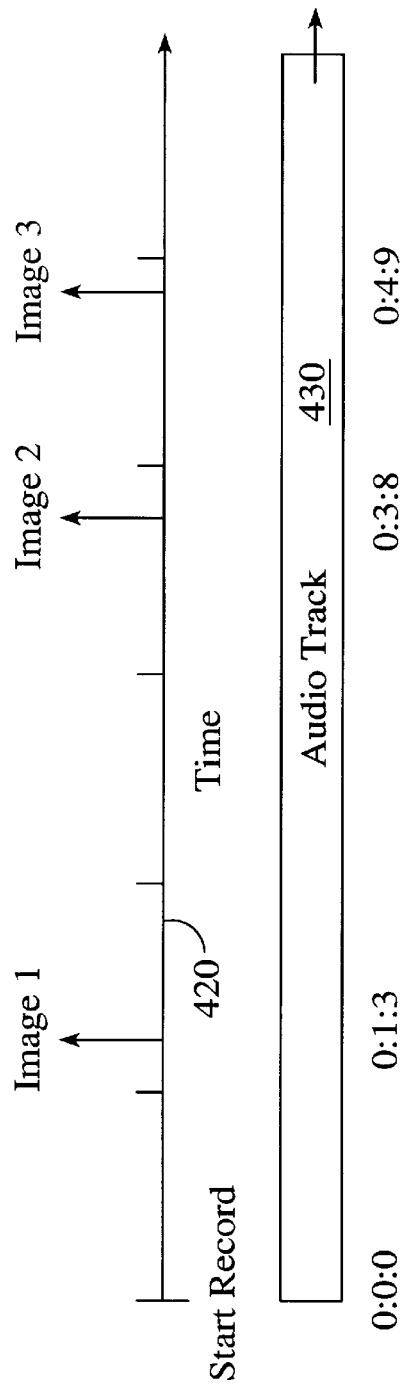
FIG. 5 is a timing diagram showing the recording of a slide show in real-time according to the present invention.

FIG. 5 is a timing diagram showing the recording of a slide show in real-time according to the present invention. A horizontal time-line 420 is shown that begins at time zero and extends continuously in time, as shown by arrow. Referring to FIGS. 4 and 5, at time zero, a user begins recording an audio track 430 by depressing the sound button 414. Since audio is inherently a time-based media, the audio track 430 implicitly includes relative time references. The time references are shown in FIG. 5 as seconds, but may be any other measure of time.

As the audio track is recording, the user may then depress the photo button 404 to capture still images (shown by the vertical arrows) at times along the time-line 420 that correspond to specific time references in the audio track 430. As shown, image 1 is taken 1.3 seconds after the start of the audio track 430 recording. Image 2 is taken 3.8 seconds after the start of the audio track 430 recording, and image 3 is taken 4.9 seconds after the start of audio track 430 recording. After the user has captured the desired number of images, the user ends the recording of the audio track 430 by depressing the sound button 414 a second time.

According to the present invention, the captured images are associated with the times they were taken during the audio track 430, which converts the captured images into a time-based media as well. The series of images, their respective time references, and the audio track 430 may then be stored as a multi-media object, referred to herein as a slide-show.

After all the images captured during the audio track 430 have been combined to create a slide show, an image cell 418 is displayed in the view finder 402 corresponding to the slide show. The user may select the slide-show image cell 418 using the four-way navigation button 406, and then press a function button 410 to play the slide show in the view finder 402.

Figure 6:
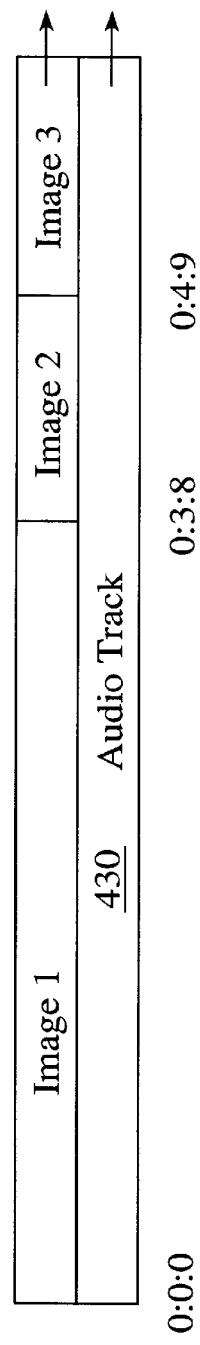
FIG. 6 is a block diagram illustrating the play back of the slide show with the audio.

FIG. 6 is a block diagram illustrating the play back of the slide show with the audio. When the slide show is played back, both the images and the audio are played in sequence. After the audio track 430 begins, each image in the slide show is displayed in the view finder 402 at a time along the audio track 430 indicated by the time reference that was associated with that image during capture.

As shown in FIG. 6, at the beginning of the audio track 430, the audio track 430 time reference is zero. Since image 1 is the first image in the series, image 1 may either be displayed at time zero, as shown in FIG. 6, or 1.3 seconds later, which is the time reference associated with the capture of image 1. Image 2 is displayed 3.8 seconds into the audio track 430, which is the time reference associated with the capture of image 2. And image 3 is displayed 4.9 seconds into the audio track 430, which is the time reference associated with the capture of image 3.

Creating a slide show with sound in real-time in accordance with the present invention has many real world applications. The digital camera 118 may be used to create such a slide show for many occasions, such as a birthday party, for instance. Assume that during the birthday party a parent wants to record the singing of "Happy Birthday" while their daughter is blowing out the candles of a birthday cake. Using the digital camera 118, the parent can begin recording the audio of the song while taking pictures of the daughter, the people at the table, and of the cake, in real-time. Immediately after the slide show has been created, the parent can then play back the slide show to the people at the party either on the view finder 402 of the digital camera 118 or on the television. When the slide show is played back, the users hear the singing of "Happy Birthday" while the pictures of the scene are displayed at the exact time they were taken during the song. Moreover, the quality of the images are superior to that provided by a video recorder, since video recorders have problems with bouncing images and dim light situations. And with the present invention, higher resolution capture can be used, for example 3×5 or 4×5 prints can be made of desired images.

A method and system for creating a slide show with a sound track in real-time using a digital camera has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for creating a slide show with real-time audio in a digital camera, the digital camera including an image device for capturing digital image data, and a memory for storing the digital image data as still images, the method comprising the steps of:

(a) continuously recording audio and storing the audio in the memory to create recorded audio that includes a time-based time-line;

(b) capturing a plurality of still images, each one of the plurality of images captured at a time along the time-line;

(c) ending the recording of the audio; and (d) presenting a slide show from the plurality of images retrieved from the memory and the recorded audio, whereupon initiation of the slide show presentation, the recorded audio is continuously played and each one of the plurality of images is automatically displayed on a display device at the time that the image was captured along the time-line of the recorded audio.

2. A method as in claim 1 wherein the digital camera includes a view finder, step (d) further including the step of:

(d1) displaying each one of the plurality of images in the view finder.

3. A method as in claim 2 wherein the digital camera includes one or more function buttons, step (a) further including the step of:

(a1) depressing one of the function buttons to begin the recording of the audio.

4. A method as in claim 3 wherein step (b) further includes the step of:

(b1) depressing one of the function buttons to capture each one of the plurality of images.

5. A method as in claim 4 wherein step (c) further includes the step of:

(c1) depressing one of the function buttons to end the recording of the audio.

6. A method as in claim 5 wherein step (c) further includes the step of:

(c2) saving the plurality of captured images and the audio recording to create a multimedia object.

7. A digital camera for creating a slide show with real-time audio, the digital camera comprising:

an image device for capturing digital image data;

a memory for storing the digital image data as still images;

means for continuously recording audio and storing the audio in the memory to create recorded audio that includes a time-based time-line;

means for capturing a plurality of still images at times along the time-line; and means for presenting a slide show from the plurality of images retrieved from memory and the recorded audio, wherein the recorded audio is continuously played, and each one of the plurality of images is automatically displayed on a display device at the time that the image was captured along the time-line of the recorded audio.

8. A digital camera as in claim 7 wherein the digital camera includes a view finder, and each one of the plurality of images is displayed in the view finder.

9. A digital camera as in claim 8 wherein the digital camera includes one or more function buttons, and one of the function buttons is depressed to begin the recording of the audio.

10. A digital camera as in claim 9 wherein one of the function buttons is depressed to capture each one of the plurality of images.

11. A system as in claim 10 wherein one of the function buttons is depressed to end the recording of the audio.

12. A system as in claim 11 wherein the plurality of captured images and the audio recording is saved to create a multimedia object.

13. A method for creating a multimedia object in a digital camera, the digital camera including an image device for capturing digital image data, and a memory for storing the digital image data as still images, the method comprising the steps of:

(a) continuously recording audio and storing the audio in the memory using the digital camera to provide a time-based audio recording having a plurality of time references;

(b) capturing a first image at a first one of the time references;

(c) capturing a second image at a second one of the time references;

(d) ending the audio recording;

(e) saving the audio recording, the first image, and the second image as a multimedia object; and (f) playing the multimedia object by
  (i) starting and continuously playing the audio recording,
  (ii) retrieving the first image from the memory and automatically displaying the first image, and
  (iii) retrieving the second image from the memory and automatically displaying the second image beginning at the second one of the time references.

14. A method as in claim 13 wherein the digital camera includes a view finder, step (f) further including the step of:

(f1) displaying the first and second images in the view finder.

* * * * *